United States Patent Office 2,971,994
Patented Feb. 14, 1961

2,971,994
PREPARATION OF LONGER CHAIN POLYMERS

Louis Schmerling, Riverside, Ill., assignor to Universal Oil Products Company, Des Plaines, Ill., a corporation of Delaware No Drawing. Filed June 26, 1959, Ser. No. 822,991

11 Claims. (Cl. 260—683)

This invention relates to a process for the preparation of polymers and particularly to a method for the preparation of relatively high molecular weight polymers having a desired number of carbon atoms in the molecule.

It has now been discovered that certain polymers possess outstanding properties which make said polymers desirable as starting materials in the preparation of certain chemical compounds. For example, it has been found that detergents which are prepared from propylene pentamers (branched-chain alkenes having 15 carbon atoms) possess increased detergency and wetting properties and other desirable properties over those which are prepared from propylene tetramers (branched-chain alkenes having 12 carbon atoms). However, the preparation of propylene pentamer is difficult due to the fact that the polymerization of propylene in the presence of the usual acid catalysts practically ceases at the tetramer stage of the polymerization and yields only insignificant quantities of propylene pentamer.

Therefore, due to the fact that there is an increasing demand for propylene pentamer it is an object of this invention to provide a method for the preparation of said material.

A further object of this invention is to provide a method whereby propylene pentamer may be obtained in relatively larger yields and lower cost.

One embodiment of this invention resides in a process for the preparation of a higher molecular weight polymer which comprises hydrohalogenating an olefin polymer, condensing the resultant hydrohalogenated polymer with the olefin monomer and dehydrohalogenating the resultant product to form the desired higher molecular weight polymer.

Another embodiment of this invention resides in a process for the preparation of a higher molecular weight polymer which comprises hydrohalogenating an olefin polymer at a pressure in the range of from about 1 to about 50 atmospheres, condensing the resultant hydrohalogenated polymer with the olefin monomer in the presence of a Friedel-Crafts catalyst at a temperature in the range of from about $-50°$ to about $150°$ C. and at a pressure in the range of from about atmospheric to about 100 atmospheres and dehydrohalogenating the resultant product at a temperature in the range of from about $100°$ to about $300°$ C. to form the desired higher molecular weight polymer.

A further embodiment of this invention resides in a process for the preparation of a higher molecular weight polymer which comprises treating an olefin polymer with anhydrous hydrogen bromide at a pressure in the range of from about 1 to about 50 atmospheres, condensing the resultant hydrobrominated polymer with an olefinic hydrocarbon in the presence of zinc chloride at a temperature in the range of from about $-20°$ to about $100°$ C. and at a pressure in the range of from about atmospheric to about 100 atmospheres and dehydrobrominating the resultant compound at a temperature in the range of from about $100°$ to about $300°$ C. in the presence of calcium chloride to form the desired higher molecular weight polymer.

A specific embodiment of the invention is found in a process for the preparation of propylene pentamer which comprises hydrochlorinating propylene tetramer with anhydrous hydrogen chloride at a pressure in the range of from about 10 to about 30 atmospheres, condensing the resultant tertiary dodecyl chlorides with propene in the presence of aluminum chloride at a temperature in the range of from about $-20°$ to about $+30°$ C. and at a pressure in the range of from about atmospheric to about 100 atmospheres and dehydrochlorinating the resultant pentadecyl chlorides in the presence of calcium chloride at a temperature in the range of from about $100°$ to about $250°$ C. to form the desired propylene pentamer.

Other objects and embodiments referring to alternative polymers and alternative catalysts will be found in the following further detailed description of the invention.

As hereinbefore set forth higher molecular weight polymers may be prepared from lower molecular weight olefin polymers by treating the latter with a hydrohalogenating agent, thereafter condensing the hydrohalogenated material with the olefin monomer, and thereafter dehydrohalogenating the condensation product to form the polymer of the desired molecular weight. For example, propylene tetramer may be hydrochlorinated to form tertiary dodecyl chlorides which are then condensed with propene to yield pentadecyl chlorides, dehydrochlorination of the latter yielding the desired propylene pentamer.

Polymeric hydrocarbons which may be used in the process of the present invention include propylene dimer, propylene trimer, propylene tetramer, etc., butylene dimer, butylene trimer, butylene tetramer, etc., said polymers having been prepared by any of the well known polymerization reactions, such as treating an olefinic hydrocarbon, or an organic compound capable of forming an olefinic hydrocarbon at polymerization conditions, in the presence of an acidic catalyst such as phosphoric acid in either liquid or solid form, or any other known polymerization catalyst. Unsaturated hydrocarbon monomers which may be condensed with the aforesaid polymers include those having at least three carbon atoms per molecule such as propene, 1-butene, 2-butene, 1-pentene, 2-pentene, 3-pentene, 1-hexene, 2-hexene, 3-hexene, 1-heptene, 2-heptene, 3-heptene, 4-heptene, etc. Cycloolefins may also be used, but not necessarily with equivalent results; these include cyclohexene, 1-methylcylcohexene, etc. It is also contemplated within the scope of this invention to use, as lower molecular weight polymer, the polymer obtained from certain compounds capable of producing olefinic hydrocarbons, or intermediates thereof under polymerizing conditions. Typical olefin producing compounds capable of use include alkyl chlorides, alkyl bromides and alkyl iodides capable of undergoing dehydrohalogenation to form olefinic hydrocarbons. Alcohols capable of dehydration to olefins under polymerizing conditions may also be used. Examples of such alkyl halides include n-propyl chloride, isopropyl chloride, n-butyl chloride, isobutyl chloride, t-butyl chloride, the pentyl chlorides, hexyl chlorides, etc., n-propyl bromide, isopropyl bromide, n-butyl bromide, isobutyl bromide, t-butyl bromide, the pentyl bromides, hexyl bromides, etc., ethyl iodide, n-propyl iodide, isopropyl iodide, n-butyl iodide, isobutyl iodide, t-butyl iodide, the amyl iodides, hexyl iodides, etc. Typical examples of alcohols are n-propyl alcohol, isopropyl alcohol, the butyl alcohols, the pentyl alcohols, the hexyl alcohols, etc.

The first step of the process, as hereinbefore set forth, comprises the hydrohalogenation of a polymeric hydrocarbon. This hydrohalogenation is effected by treating the polymeric hydrocarbon with the desired hydrohalogenating agent, the preferred agents comprising hydrogen chloride and hydrogen bromide in substantially anhydrous condition. The hydrohalogenation is effected at pressures ranging from about 1 to about 50 atmospheres, preferably in a range of from about 10 to about 30 atmospheres and at temperatures ranging from atmospheric to about 50° C. or more. It may be carried out at subatmospheric temperatures using a solvent such as acetic acid. It may also be accomplished at relatively low temperatures and pressures by using a catalyst, preferably a metal halide.

The second step of the process of the present invention, namely the condensation step, is effected by condensing the hydrohalogenated polymer with the desired orefinic hydrocarbon in the presence of a Friedel-Crafts metal halide catalyst such as aluminum chloride, zirconium chloride, ferric chloride, zinc chloride, bismuth chloride, boron trifluoride, etc. For purposes of this invention the compound boron trifluoride will be considered a metal halide although boron is, in reality, a metalloid. The condensation step is effected at a pressure ranging from about atmospheric to about 100 atmospheres or more and at a wide range of temperatures, said range being from about −50° to about 150° C. The wide range of temperatures is governed by the choice of Friedel-Crafts metal halide catalyst to be used in the condensation reaction. For example, when a relatively active Friedel-Crafts catalyst such as aluminum chloride or ferric chloride is used the temperature will range from about −20° to about +30° C., while if a relatively inactive Friedel-Crafts metal halide catalyst such as zinc chloride is used, the temperature which is required for successful condensation of the reactants will be in a range of from about 40° to about 100° C.

The final stage of the process, namely the dehydrohalogenation of the resultant compound, can be effected by a number of methods. The compound may be treated at elevated temperatures ranging from about 100° to about 300° C., and at substantially atmospheric pressure, in the presence of a suitable dehydrohalogenating agent, particularly a catalyst such as calcium chloride, zinc chloride, etc. It may also be dehydrohalogenated by treatment with alkali, for example, sodium or potassium hydroxide dissolved in water or alcohol, but this method has the disadvantage that the hydrogen halide is consumed and is not available for recycling to the first step of the process. Soda-lime or organic bases such as quinoline may also be used but have the same disadvantage.

The process of the present invention may be effected in any suitable manner and may comprise either a batch or a continuous type operation. When a batch type operation is used a quantity of the polymeric hydrocarbon is placed in a suitable apparatus such as a rotating autoclave. The autoclave is flushed with an inert gas such as nitrogen and is thereafter sealed. The hydrohalogenating agent such as the substantially anhydrous hydrogen chloride or hydrogen bromide is pressured into said apparatus until the desired pressure has been reached. Following a predetermined residence time the autoclave is vented to release any excess gases, the product is withdrawn, and the alkyl halide is recovered by distillation. The alkyl halide (at a temperature below the reaction temperature) is then placed in another suitable apparatus which may also comprise a rotating autoclave or an alkylation flask along with the Friedel-Crafts metal halide catalyst and inert diluent, such as a normal paraffin, if desired. The olefinic hydrocarbon, if in gaseous form, is pressed in until the desired pressure has been reached after which the autoclave is brought to the desired temperature, either subatmospheric if a relatively active Friedel-Crafts metal halide catalyst of the type hereinbefore set forth is used, or superatmospheric temperature if a relatively inactive catalyst of the type hereinbefore set forth is employed. Alternatively the apparatus containing the alkyl halide may be brought to the desired temperature according to the particular catalyst to be used, after which the catalyst is added, the mixture is continuously stirred and the olefinic hydrocarbon is then slowly added to said stirred mixture. After a predetermined residence time has been met, the apparatus and contents thereof are allowed to return to room temperature, the excess gases, if any, are vented, the higher molecular weight alkyl halide is separated from the catalyst layer and the desired product is recovered by conventional means such as fractional distillation, etc. The desired polymer is then prepared by passing the alkyl halide over a suitable catalyst of the type hereinbefore set forth at an elevated temperature in yet another appropriate apparatus. The desired polymer is then recovered by conventional means hereinbefore set forth.

The process of this invention may also be effected in a continuous type operation. When this method is used the polymeric hydrocarbon is continuously charged to a reaction zone which is maintained at the proper operating conditions of temperature and pressure. The reaction zone may comprise an unpacked vessel or coil or may be lined with an adsorbent packing material such as alumina, dehydrated bauxite, fire brick, and the like. The hydrohalogenating agent comprising a substantially anhydrous hydrohalide and preferably hydrogen chloride or hydrogen bromide is also continuously charged to the reaction zone through separate lines. The resultant alkyl halide is continuously withdrawn from the reactor and charged to a second reaction zone which may be similar in design to the first and which is also maintained at the proper operating conditions of temperature and pressure. This second reaction zone is provided with the suitable Friedel-Crafts metal halide catalyst. The alkyl halide is charged to this second reaction zone at a liquid hourly space velocity (volume of charge per volume of catalyst per hour) in a range of from about 0.1 to about 20 or more and preferably in a range of from about 0.5 to about 10. The olefinic hydrocarbon, in either gaseous or liquid form, is also continuously charged to this second reaction zone through separate lines. If so desired, the alkyl halide and olefinic hydrocarbon may be admixed prior to entry into said reaction zone and charged thereto in a single stream. One particularly suitable method of continuous type operation comprises the fixed bed type in which the catalyst is disposed as a fixed bed in the reaction zone and the reactants pass over said bed in either an upward or downward flow. Another suitable type of operation which may be used comprises the compact moving bed type of operation in which the catalyst and the reactants pass either concurrently or countercurrently to each other. Yet another type of operation which may be used comprises the slurry type of operation in which the catalyst is carried into the reaction zone as a slurry in either one or the other of the starting materials.

The condensation product comprising the higher molecular weight alkyl halide is continuously withdrawn from the second reaction zone, separated from unreacted starting materials, the latter being recycled to form a portion of the feed stock, and continuously charged to yet a third reaction zone which is also similar in design to the first and second reaction zone and which is also maintained at the proper operating conditions of temperature and pressure. This reaction zone contains the dehydrohalogenating catalyst of the type hereinbefore set forth. The higher molecular weight alkyl halide is also charged to the reaction zone at a liquid hourly space velocity in a range of from about 0.1 to about 20 or more and preferably in a range of from about 0.5 to about 10. After a predetermined residence time has been completed the higher molecular weight polymer is continuously withdrawn and, if so desired, may be passed to a fractionator or separation zone wherein the desired polymer is separated from undesired side products and recovered.

It is also contemplated within the scope of this invention that the latter two steps of the process, that is, the condensation of the alkyl halide and the olefinic hydrocarbon, and the dehydrohalogenation of the resultant higher molecular weight alkyl halide may be effected simultaneously by carrying out the step at a relatively higher temperature than hereinbefore set forth. For example, the condensation and dehydrohalogenation step may be effected by carrying out said step at a temperature ranging from about 30° to about 150° C., the temperature again being dependent upon the particular Friedel-Crafts metal halide catalyst which is employed in the condensation step of the reaction. For example, when aluminum chloride is used as the condensation catalyst the temperature will be in the range of from about 30° to about 50° C., while if zinc chloride is used a temperature in the range of from about 100° to about 125° C. may be employed. In addition to the Friedel-Crafts metal halide catalysts which have been mentioned as being particularly adaptable for use in this condensation step it is also considered within the scope of this invention that an acid catalyst such as phosphoric acid may be used for this combined condensation and dehydrohalogenation step of the reaction.

The following examples, which are given to illustrate the process of the present invention are not, however, intended to limit the generally broad scope of the present invention in strict accordance therewith.

Example I

In this experiment 546 g. of propylene tetramer were placed in the glass liner of a rotating autoclave having a 3600 cc. capacity. The liner was flushed with nitrogen and then charged to 30 atmospheres with anhydrous hydrogen chloride. The temperature during the reaction period ranged from 24° to 30° C. and was maintained thereat for a period of about 6.5 hours. The pressure fell to about 15 atmospheres during twenty minutes, and when this point was reached the autoclave was recharged with additional anhydrous hydrogen chloride until a pressure of 30 atmospheres was again reached, said autoclave being thus recharged seven times during the residence time. At the end of this reaction period the excess gases were vented and 667 g. of liquid product was recovered. The product was subjected to fractional distillation and the cut boiling at 63° C. at 1.2 mm. pressure (231° C. at 760 mm. pressure) having a refractive index, $n_D^{20}$ 1.4485, comprising propylene tetramer hydrochloride (chiefly tertiary dodecyl chlorides) was recovered.

A three-necked alkylation flask was used for the condensation of the tertiary dodecyl chlorides, a mixture of 78 g. (0.38 mole) of this propylene tetramer hydrochloride along with 38 g. of n-pentane being placed in said flask. The stirred mixture was cooled to −50° C. in a Dry-Ice acetone bath. Five grams of the catalyst consisting of ferric chloride was then added and propene was bubbled beneath the surface of the stirred mixture. The temperature of the reaction mixture was permitted to rise slowly to about −9° C. at which point rapid absorption of the propene took place. The temperature of the reaction mixture was maintained in the range of from about −20° to about 0° C. during the addition of 25 g. of propene in one hour. Stirring was continued for an additional two hours after which time the reaction mixture was allowed to warm to room temperature. The liquid product consisting of about 133 g. was decanted from the coagulated catalyst, washed with water, dried and subjected to fractional distillation from potassium carbonate. The cut boiling at 102–106° C. at 1.5 mm. pressure (283–290° C. at 760 mm. pressure) was recovered. This cut had a refractive index, $n_D^{20}$ 1.4561.

The pentadecyl chloride (7.0 g., 8.1 cc.), the preparation of which was described in the above paragraph, was heated under reflux, the temperature of the flask being about 255° C. The material was cooled and 1 g. of granular calcium chloride was added to the mixture, following which the mixture was again heated. Hydrogen chloride was evolved when the temperature reached about 200° C., the maximum reflux temperature being about 238° C. The refluxing was continued for a period of about 2.5 hours after which time the product was allowed to cool to room temperature, washed with water and subjected to fractional distillation in a Minical column, the cut, comprising propylene pentamer, boiling at 77° C. at 2.0 mm. pressure (240° C. at 760 mm. pressure) having a refractive index of $n_D^{20}$ 1.4470 was separated and recovered.

Example II

In this experiment the propylene tetramer hydrochloride was prepared according to the method set forth in Example I above. A mixture of 78 g. (0.38 mole) of the propylene tetramer hydrochloride, 5 g. of ferric chloride, and 38 g. of n-pentane was placed in a three-necked alkylation flask. The mixture was cooled to a temperature in the range of from about 0° to about 12° C. and 18 g. of propylene were slowly bubbled beneath the surface of the mixture which was constantly stirred. The addition of the propylene took about one hour to complete after which stirring was continued for an additional two hours. The liquid product consisting of about 140 g. was decanted from the catalyst globules, washed with water, dried and subjected to fractional distillation, the cut boiling at 99–102° C. at 1.1 mm. pressure (288–291° C. at 760 mm. pressure) having a refractive index of $n_D^{20}$ 1.4560 was separated and recovered.

The pentadecyl chloride recovered thereby was dehydrochlorinated in a manner similar to that set forth in Example I above and the desired propylene pentamer was recovered therefrom.

Example III

Propylene tetramer hydrochloride prepared as described in Example I above is placed in a three-necked alkylation flask which is cooled to approximately −20° C. by means of a Dry Ice-acetone bath. Aluminum chloride catalyst is added to the stirred mixture after which propylene is slowly bubbled beneath the surface of the stirred mixture for a period of about one hour. At the end of this time the addition of the propylene is discontinued and the mixture is continuously stirred for an additional two hours. At the end of this time the mixture is allowed to warm to room temperature, the upper layer is decanted, washed with water, dried and subjected to fractional distillation from potassium carbonate. The pentadecyl chloride thus obtained is passed over calcium chloride in a tube heated at 250° C. and propylene pentamer is recovered.

Example IV

Propylene tetramer (about 500 g.) is placed in the glass liner of a rotating autoclave having a 3600 cc. capacity. The liner is sealed into the autoclave and is flushed with nitrogen. Following this anhydrous hydrogen bromide is charged to the liner until a pressure of 30 atmospheres has been reached. The autoclave is rotated at room temperature, and additional hydrogen bromide is charged to 30 atmospheres pressure whenever the pressure falls to a level of about 15 atmospheres. At the end of the reaction time of about 6–8 hours, the excess gases are vented and the reaction product is subjected to fractional distillation under reduced pressure. The cut comprising propylene tetramer hydrobromide (tertiary dodecyl bromides) is separated and recovered.

The dodecyl bromide which was prepared in the above step is placed in an alkylation flask along with 5 g. of zinc chloride, the solution also containing an organic diluent comprising n-pentane. The mixture is heated to a temperature of about 75° C. and propene bubbled into said mixture beneath the surface thereof. At the end of the addition of propene which takes approximately one hour the mixture is continuously stirred for an additional two hours and then allowed to cool to room temperature. The liquid product is decanted from the catalyst, washed with water, dried and subjected to fractional distillation from potassium carbonate. The cut comprising pentadecyl bromide is separated and recovered.

The pentadecyl bromide which is prepared in the above step is heated with calcium chloride at a temperature of about 200° C. for a period of about 3 hours after which time the product is cooled and subjected to fractional distillation, the cut boiling at about 230–240° C. comprising propylene pentamer being separated and recovered therefrom.

I claim as my invention:

1. A process for the preparation of propylene pentamer which comprises hydrohalogenating propylene tetramer with a hydrohalogenating agent selected from the group consisting of hydrogen chloride and hydrogen bromide, condensing the resultant dodecyl halides with propene and dehydrohalogenating the resultant pentadecyl halide to form the desired propylene pentamer.

2. A process for the preparation of propylene pentamer which comprises hydrohalogenating propylene tetramer with a hydrohalogenating agent selected from the group consisting of hydrogen chloride and hydrogen bromide at a pressure in the range of from about 1 to about 50 atmospheres, condensing the resultant dodecyl halides with propene at a temperature in the range of from about —20° to about 150° C. and at a pressure in the range of from about atmospheric to about 100 atmospheres, and dehydrohalogenating the resultant pentadecyl halide at a temperature in the range of from about 100° to about 300° C. to form the desired propylene pentamer.

3. A process for the preparation of propylene pentamer which comprises hydrohalogenating propylene tetramer with a hydrohalogenating agent selected from the group consisting of hydrogen chloride and hydrogen bromide at a pressure in the range of from about 1 to about 50 atmospheres, condensing the resultant dodecyl halides with propene in the presence of a Friedel-Crafts catalyst at a temperature in the range of from about —20° to about 150° C. and at a pressure in the range of from about atmospheric to about 100 atmospheres, and dehydrohalogenating the resultant pentadecyl halide in the presence of a catalyst at a temperature in the range of from about 100° to about 300° C. to form the desired propylene pentamer.

4. A process for the preparation of propylene pentamer which comprises treating propylene tetramer with anhydrous hydrogen chloride at a pressure in the range of from about 1 to about 50 atmospheres, condensing the resultant dodecyl chlorides with propene in the presence of zinc chloride at a temperature in the range of from about 20° to about 150° C. and at a pressure in the range of from about atmospheric to about 100 atmospheres and dehydrochlorinating the resultant pentadecyl chloride at a temperature in the range of from about 100° to about 300° C. in the presence of a catalyst to form the desired propylene pentamer.

5. A process for the preparation of propylene pentamer which comprises treating propylene tetramer with anhydrous hydrogen bromide at a pressure in the range of from about 1 to about 50 atmospheres, condensing the resultant dodecyl bromides with propene in the presence of zinc chloride at a temperature in the range of from about 20° to about 150° C. and at a pressure in the range of from about atmospheric to about 100 atmospheres and dehydrobrominating the resultant pentadecyl bromide at a temperature in the range of from about 100° to about 300° C. in the presence of calcium bromide to form the desired propylene pentamer.

6. A process for the preparation of propylene pentamer which comprises treating propylene tetramer with anhydrous hydrogen chloride at a pressure in the range of from about 1 to about 50 atmospheres, condensing the resultant dodecyl chlorides with propene in the presence of aluminum chloride at a temperature in the range of from about —20° to about 50° C. and at a pressure in the range of from about atmospheric to about 100 atmospheres and dehydrochlorinating the resultant pentadecyl chloride at a temperature in the range of from about 100° to about 300° C. in the presence of calcium chloride to form the desired propylene pentamer.

7. A process for the preparation of propylene pentamer which comprises treating propylene tetramer with anhydrous hydrogen chloride at a pressure in the range of from about 1 to about 50 atmospheres, condensing the resultant dodecyl chlorides with propene in the presence of ferric chloride at a temperature in the range of from about —20° to about 50° C. and at a pressure in the range of from about atmospheric to about 100 atmospheres and dehydrochlorinating the resultant pentadecyl chloride at a temperature in the range of from about 100° to about 300° C. in the presence of calcium chloride to form the desired propylene pentamer.

8. A process for the preparation of propylene pentamer which comprises hydrochlorinating propylene tetramer with anhydrous hydrogen chloride at a pressure in the range of from about 10 to about 30 atmospheres, condensing the resultant dodecyl chlorides with propene in the presence of aluminum chloride at a temperature in the range of from about —20° to about +30° C. and at a pressure in the range of from about atmospheric to about 100 atmospheres, and dehydrochlorinating the resultant pentadecyl chloride in the presence of a dehydrochlorinating catalyst to form the desired propylene pentamer.

9. A process for the preparation of propylene pentamer which comprises hydrochlorinating propylene tetramer with anhydrous hydrogen chloride at a pressure in the range of from about 10 to about 30 atmospheres, condensing the resultant dodecyl chlorides with propene in the presence of aluminum chloride at a temperature in the range of from about —20° to about +30° C. and at a pressure in the range of from about atmospheric to about 100 atmospheres, and dehydrochlorinating the resultant pentadecyl chloride in the presence of calcium chloride at atmospheric pressure and a temperature in the range of from about 200° to about 250° C. to form the desired propylene pentamer.

10. A process for the preparation of propylene pentamer which comprises hydrobrominating propylene tetramer with anhydrous hydrogen bromide at a pressure in the range of from about 10 to about 30 atmospheres, condensing the resultant dodecyl bromides with propene in the presence of aluminum chloride at a temperature in the range of from about —20° to about +30° C. and at a pressure in the range of from about atmospheric to about 100 atmospheres, and dehydrobrominating the resultant pentadecyl bromide in the presence of calcium chloride at atmospheric pressure and a temperature in the range of from about 200° to about 250° C. to form the desired propylene pentamer.

11. A process for the preparation of propylene pentamer which comprises hydrochlorinating propylene tetramer with anhydrous hydrogen chloride at a pressure in the range of from about 10 to about 30 atmospheres, condensing the resultant dodecyl chlorides with propene in the presence of zinc chloride at a temperature in the range of from about 40° to about 100° C. and at a pressure in the range of from about atmospheric to about 100 atmospheres, and dehydrochlorinating the resultant pentadecyl chloride in the presence of calcium chloride at atmospheric pressure and a temperature in the range of from about 100° to about 250° C. to form the desired propylene pentamer.

References Cited in the file of this patent

UNITED STATES PATENTS

| | | |
|---|---|---|
| 2,404,927 | Schmerling et al. | July 30, 1946 |
| 2,419,500 | Peterson et al. | Apr. 22, 1947 |
| 2,533,053 | Schmerling | Dec. 5, 1950 |